United States Patent [19]

Geitner

[11] 3,747,007

[45] July 17, 1973

[54] VARIABLE COMPENSATION FOR FEEDBACK CONTROL SYSTEMS

[75] Inventor: Karl R. Geitner, Orlando, Fla.

[73] Assignee: The United States of America as represented by the Secretary of the Army, Washington, D.C.

[22] Filed: July 7, 1972

[21] Appl. No.: 269,683

[52] U.S. Cl. .................... 330/51, 330/69, 330/107

[51] Int. Cl. .................... H03f 1/36

[58] Field of Search .................... 330/9, 51, 107, 69, 330/30 D

[56] References Cited

UNITED STATES PATENTS 3,629,720 12/1971 Sedra et al. .................... 330/86

*Primary Examiner*—Roy Lake

*Assistant Examiner*—James B. Mullins

*Attorney*—William G. Gapcynski, Lawrence A. Neureither

[57] ABSTRACT

The characteristics of a compensation network for an amplifier are varied in accordance with an electronic signal representing critical system parameters. A resistive reactive "T" branch is paralleled by a switching device and resistor. The parametric signal activates the switching device and the networks are connected between the input signal and an input of the amplifier.

3 Claims, 3 Drawing Figures

VARIABLE COMPENSATION FOR FEEDBACK CONTROL SYSTEMS

SUMMARY OF THE INVENTION

The compensation network for a feedback control system is comprised of a differential d-c operational amplifier having both a feedback network and at least one input network. The input network is connected between the input signal and an input of the amplifier and consists of a multiple branch series/parallel connected resistive reactive network. One branch of this network is in the form of a resistive reactive "T" branch in parallel, a second is a pure resistive branch; and both paralleled by a branch consisting of a switching mechanism connected in series with a further resistor. A switching signal is connected to the switching device and its duty cycle is variable in accordance with the critical system parameters. The other input of the differential amplifier is connected to grounds through a balance network which consists of a resistive branch in parallel with second branch comprising a resistor in series with a switch. This switch is also controlled by the switching signal. The value of the resistor in parallel with the switching branch is said to be equal to the equivalent d-c impedance to ground of all the unswitched resistive branches seen by the amplifier of the input network. The resistance of the switched branches are equal.

The frequency of the switch signal source is set at a minimum factor of two times the maximum frequency of the main signal source. The switching devices are operated in phase with each other, and the value of the compensation network is varied as the frequency of the switching signal source.

If two or more signals are to be processed by the amplifier, then additional input networks, one for each added signal and each network similar to the first, may be connected between each of the signal sources and the appropriate amplifier input. If any signal is applied to the differential amplifier non-inverting input by way of an input network heretofore defined, then the correct balance network to be applied to the non-inverting amplifier input in addition to the input network is a duplicate of the feedback network which is connected between the non-inverting input and ground for the case of a single ended amplifier output or between the non-inverting input and an amplifier output for the case of a differential output amplifier.

DESCRIPTION OF THE PREFERRED EMBODIMENTS

Figure 1:
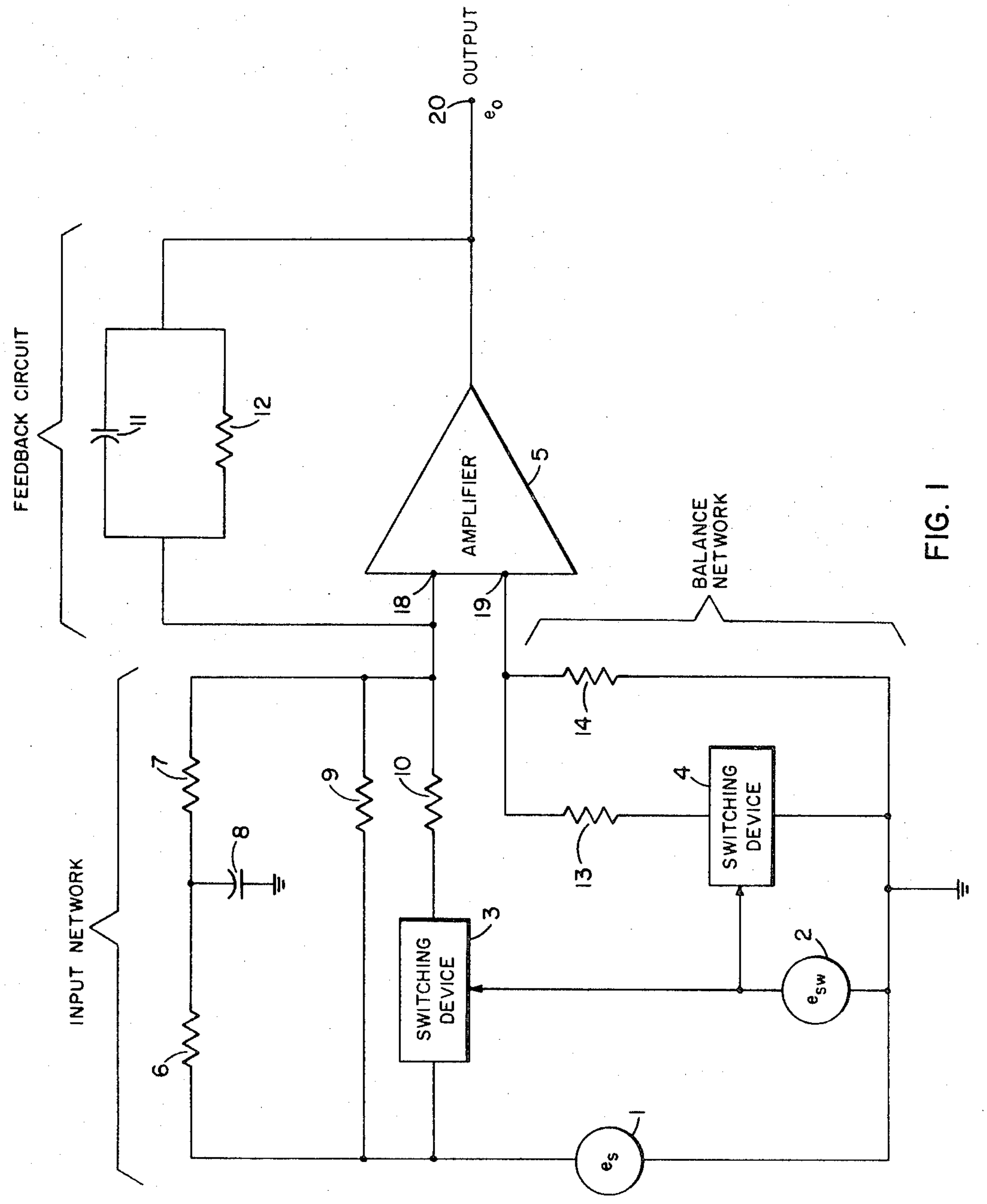
FIG. 1 is a schematic showing of a preferred embodiment of the present invention.

Referring to FIG. 1 of the drawings the input signal 1 is designated as "$e_s$." A switching signal 2 is designated "$e_{sw}$." Switching signal 2 is connected to switching devices 3 and 4 which may be any mechanical or electrical or electro-mechanical device having a high impedance between their terminals for one output state of the switch signal and a low impedance, relative to the value of resistor 10 and 13 for the alternate state.

The duty cycle of the switching signal 2 may range from 0 to 100 percent as required. Amplifier 5 has its inputs connected to resistors 10 and 13.

To insure proper operation of the circuit, the minimum frequency of switch signal source 2 must be at a minimum factor of two times the maximum frequency of interest out of signal source 1. The switching devices 3 and 4 are operated in phase with each other. The input signal 1 is connected between ground in a multiple branch series/parallel connected resistive reacted input network. This input network comprises a first branch in the form of a resistive "T" branch (resistors 6 and 7 and capacitor 8) in parallel with a pure resistive branch 9. Switching device 3 and resistor 10 parallel both of these branches to the input of amplifier 5.

Amplifier 5 is a differential input operational amplifier. A portion of the amplifier's output signal at terminal 20 is applied to its input terminal 18 by way of feedback circuit made up of capacitor 11 in parallel with resistor 12. The second amplifier input at terminal 19 is connected to ground through a balance network. The balance network is made up of resistor 14 connected in parallel with switching device 4 and resistor 13. For minimum output error due to unbalance amplifier input bias currents, the value of resistor 14 is set to be equal to the equivalent DC impedance to ground all the unswitched resistive branches seen by the amplifier's input 18. Resistor 13 is set to be equal to the switched resistor 10.

The amplifier will function to present an electrical signal at the output terminal 20 whose gain and phase relationships relative to the input signal 1 have been altered as a function of the operational amplifier network parameters. Further, the shaping or amount of phase in gain alteration thus afforded by the amplifier's networks is controlled by a switching signal whose frequency characteristics are a function of some system parameter(s) other than that giving rise to the input signal 1.

The capacitor 11 connected in parallel with the amplifier 5 is necessary to attenuate ripple at the amplifier output introduced by switching the switching devices on and off. The balanced network is necessary to make the impedance seen looking from the amplifier back into the input network equal to the impedance seen looking from the amplifier back into the balancing network. If these impedances are not matched well, a d-c offset voltage level which varies in magnitude with changes in duty cycle of signal 2 will occur at the amplifier output.

Figure 2:
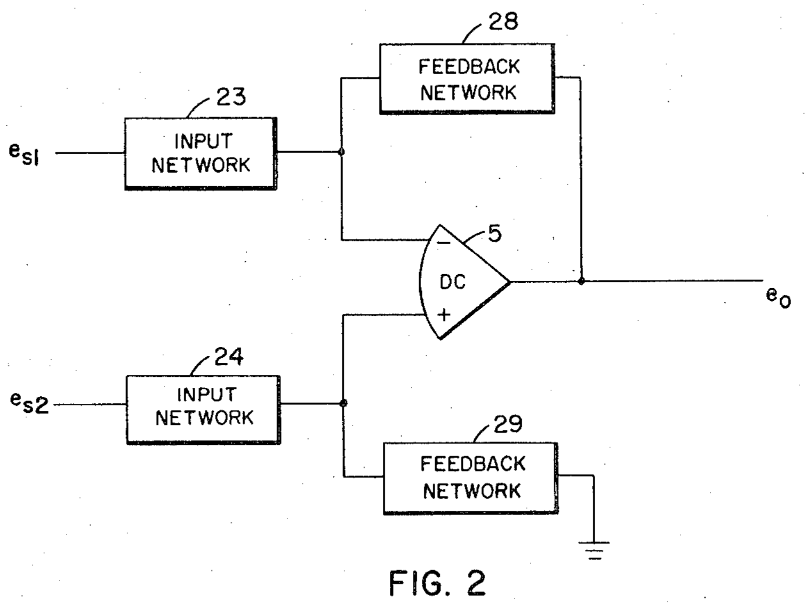
FIG. 2 shows in block diagram an alternate embodiment.
Figure 3:
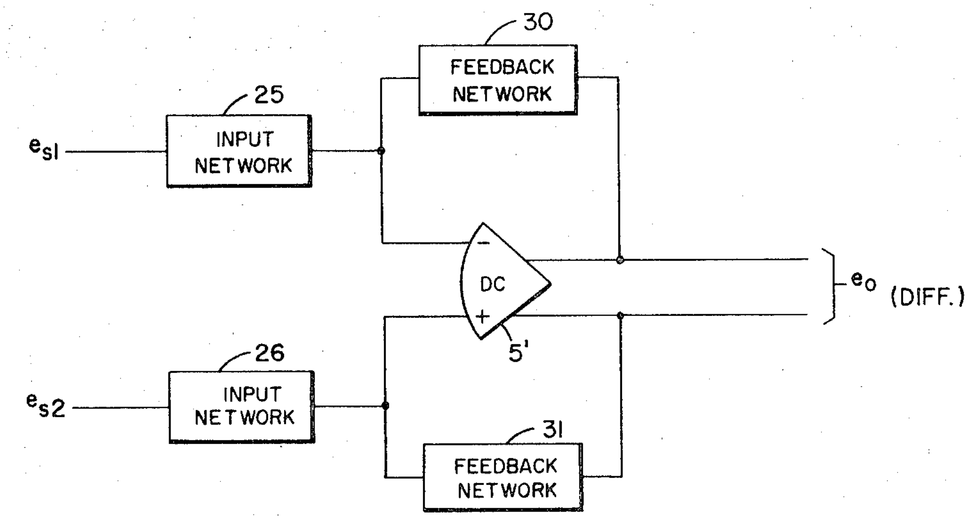
FIG. 3 is a further embodiment of the invention shown in block diagram.

FIGS. 2 and 3 show uses of the amplifier when there is more than one input signal, and the amplifier is to be used as a differential amplifier. In both FIGS. 2 and 3 the input networks 23–26 are identical to the input network of FIG. 1. The feedback networks 28–31 of amplifiers 5 and 5' are also identical to that shown in FIG. 1. In FIG. 2 the feedback network 29 is returned to ground rather than the amplifier output. The amplifier 5' of FIG. 3 has both a differential input and a differential output; therefore feedback network 31 must be fed back to the output rather than ground.

I claim:

1. A system comprising an amplifier having two inputs and at least one output; at least one feedback circuit connected between an output and an input of said amplifier; at least one input signal means; first and second networks connected between the signal means and the inputs of said amplifier; each network containing at least two parallel branches; one branch of each network containing a switching device in series therewith; said switching device each having a controlling input terminal; further signal means connected to the controlling input terminal of said switching devices so as to vary the characteristics of said networks; said first network consists of a first branch which is in the form of a resistive reactive "T" branch, a second branch is a pure resistive branch, and the third branch consisting of the series combination of said switching device and a resistor; and said second network consisting of a first pure resistive branch and a second branch containing said switching device and a resistor; and each branch being connected to a different input of said amplifier and connected to opposite sides of said signal means.

2. A system as set forth in claim 1 wherein said switching devices are switched in phase with each other; and the resistance of the two switching branches are equal to each other.

3. A system comprising an amplifier having two inputs and at least one output; first and second feedback circuits connected between an output and an input of said amplifier; first and second input signal means; first and second networks connected respectively between said first and second signal means and the inputs of said amplifier; each network containing at least two parallel branches; one branch of each network containing a switching device in series therewith; said switching device each having a controlling input terminal; said networks being identical to each other; and further signal means connected to the controlling input terminals of said switching devices so as to vary the characteristics of said networks.

* * * * *